US006974177B2

(12) United States Patent
Castillo

(10) Patent No.: US 6,974,177 B2
(45) Date of Patent: Dec. 13, 2005

(54) DUAL-AXIS DOOR HINGE ASSEMBLY FOR VEHICLES

(75) Inventor: Brian V. Castillo, Royal Oak, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/732,500

(22) Filed: Dec. 10, 2003

(65) Prior Publication Data

US 2005/0127712 A1 Jun. 16, 2005

(51) Int. Cl.[7] .................................................. B60J 5/00

(52) U.S. Cl. ..................... 296/146.12; 49/248; 16/333; 16/371

(58) Field of Search ...................... 296/146.11, 146.12; 49/192, 246, 248; 16/232, 321, 333, 371

(56) References Cited

U.S. PATENT DOCUMENTS

| | | | | |
|---|---|---|---|---|
| 4,716,623 | A * | 1/1988 | Kinaga et al. | 16/371 |
| 4,719,665 | A * | 1/1988 | Bell | 16/232 |
| 6,196,618 | B1 * | 3/2001 | Pietryga et al. | 296/146.11 |
| 6,305,737 | B1 * | 10/2001 | Corder et al. | 296/146.11 |
| 6,382,705 | B1 * | 5/2002 | Lang et al. | 296/146.12 |

* cited by examiner

*Primary Examiner*—Dennis H. Pedder
(74) *Attorney, Agent, or Firm*—Laura C. Hargitt

(57) ABSTRACT

A dual-axis door hinge assembly for a vehicle includes a body side strap adapted to be connected to a vehicle body of the vehicle. The dual-axis door hinge assembly also includes a door side strap adapted to be connected to a door of the vehicle. The dual-axis door hinge assembly further includes an intermediate link pivotally connected to the body side strap to form a first pivot axis and pivotally connected to the door side strap to form a second pivot axis.

12 Claims, 3 Drawing Sheets

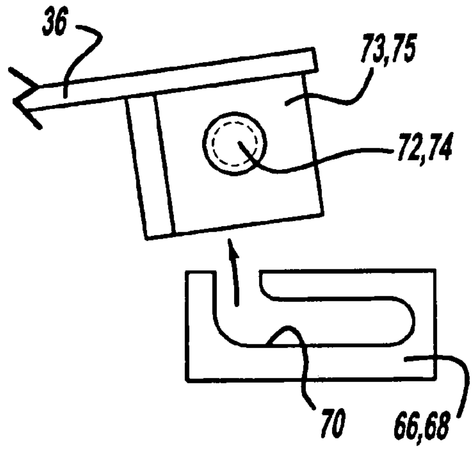
FIG - 6
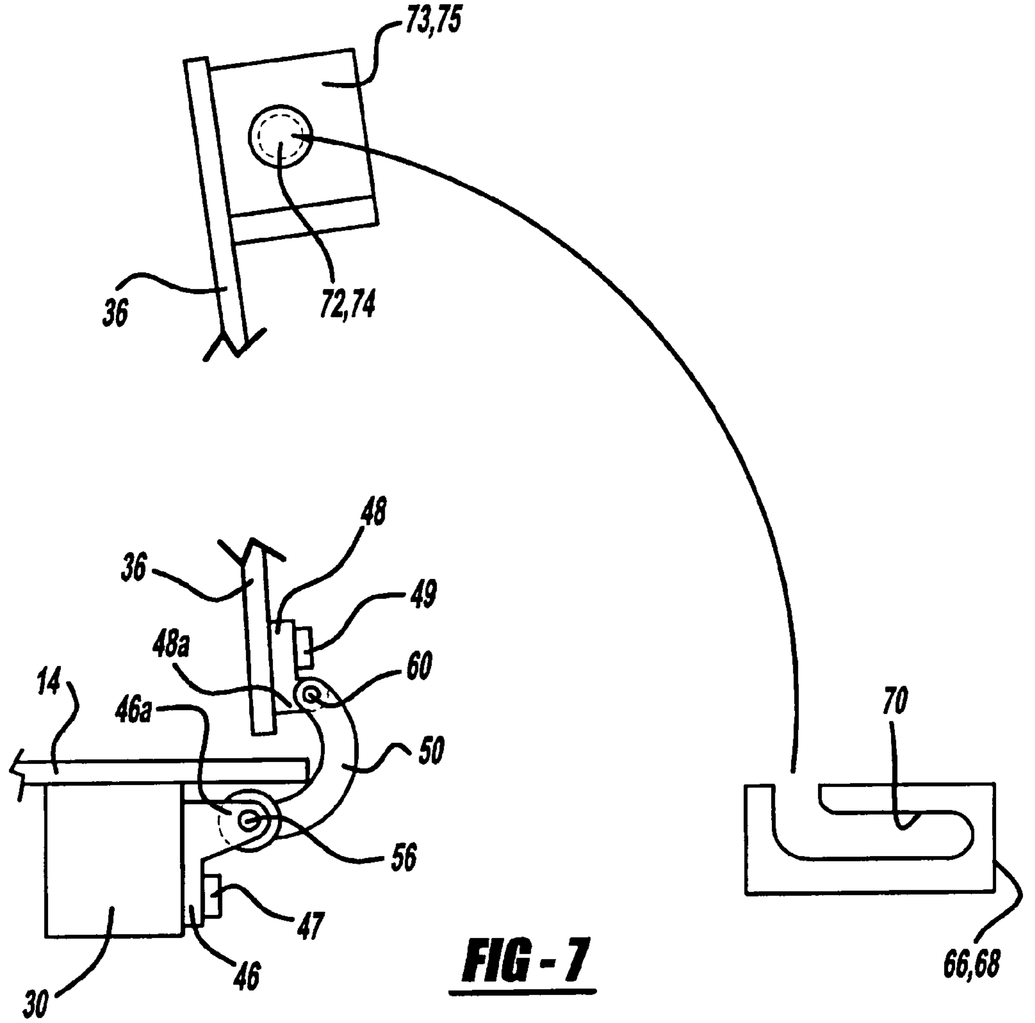
FIG - 7
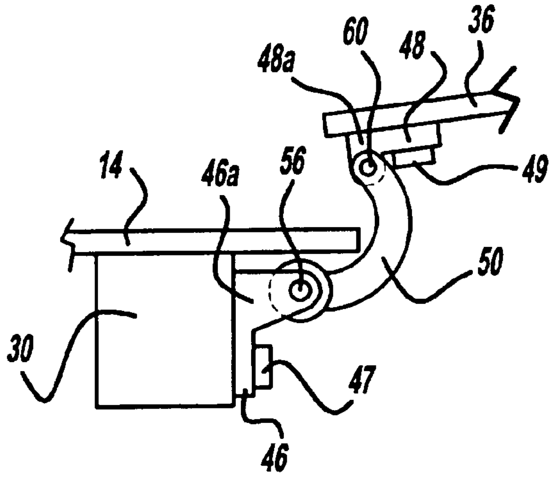

DUAL-AXIS DOOR HINGE ASSEMBLY FOR VEHICLES

TECHNICAL FIELD

The present invention relates generally to doors for vehicles and, more particularly, to a dual-axis door hinge assembly for a vehicle.

BACKGROUND OF THE INVENTION

It is known to provide a door assembly for an opening in a vehicle body of a vehicle. For example, a vehicle body may include a continuous aperture extending longitudinally from a front pillar structure to a rear pillar structure. A front door and a rear door together form a door assembly in the vehicle body and are swingably mounted on the vehicle body to move between positions opening and closing the continuous aperture. Typically, a single axis hinge is used that requires the front door to be opened before the rear door may be opened to allow movement to ninety-degree (90°). The rear access door is dependent on the front door for opening.

Therefore, it is desirable to eliminate a single axis hinge for a door assembly of a vehicle. It is also desirable to provide a hinge assembly that allows a rear access door to be opened independently of a front door of a vehicle. Thus, there is a need in the art to provide a door hinge assembly for a vehicle that meets these desires.

SUMMARY OF THE INVENTION

It is, therefore, one object of the present invention to provide a new door hinge assembly for a vehicle.

It is another object of the present invention to provide a door hinge assembly having a dual-axis for a rear access door of a vehicle.

To achieve the foregoing objects, the present invention is a dual-axis door hinge assembly for a vehicle. The dual-axis door hinge assembly includes a body side strap adapted to be connected to a vehicle body of the vehicle. The dual-axis door hinge assembly also includes a door side strap adapted to be connected to a door of the vehicle. The dual-axis door hinge assembly further includes an intermediate link pivotally connected to the body side strap to form a first pivot axis and pivotally connected to the door side strap to form a second pivot axis.

One advantage of the present invention is that a dual-axis door hinge assembly is provided for a door of a vehicle. Another advantage of the present invention is that the dual-axis door hinge assembly allows a rear access door to be opened independently of a front door of a vehicle. Yet another advantage of the present invention is that the dual-axis door hinge assembly eliminates a single axis hinge and requires less space and mass than a four-bar linkage hinge. Still another advantage of the present invention is that dual-axis door hinge assembly allows the front door and rear access door to overlap for sealing therebetween.

Other objects, features, and advantages of the present invention will be readily appreciated, as the same becomes better understood, after reading the subsequent description taken in conjunction with the accompanying drawings.

BRIEF DESCRIPTION OF THE DRAWINGS

FIG. 6 is a partial plan view of the dual-axis door hinge assembly of FIG. 1 illustrated in a second operational position.

FIG. 7 is a partial plan view of the dual-axis door hinge assembly of FIG. 1 illustrated a third operational position.

DESCRIPTION OF THE PREFERRED EMBODIMENT

Figure 1:
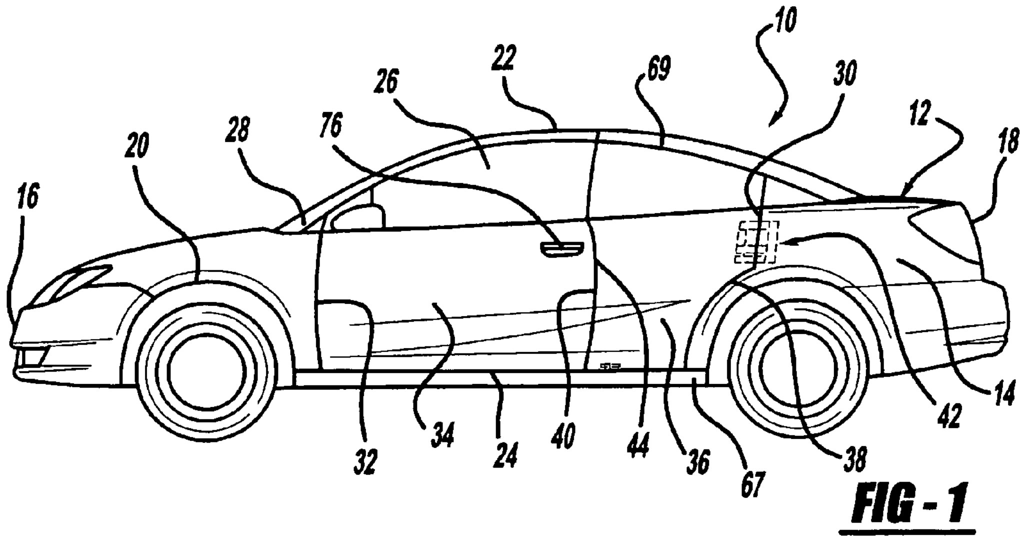
FIG. 1 is an elevational view of a dual-axis door hinge assembly, according to the present invention, illustrated in operational relationship with a vehicle.
Figure 2:
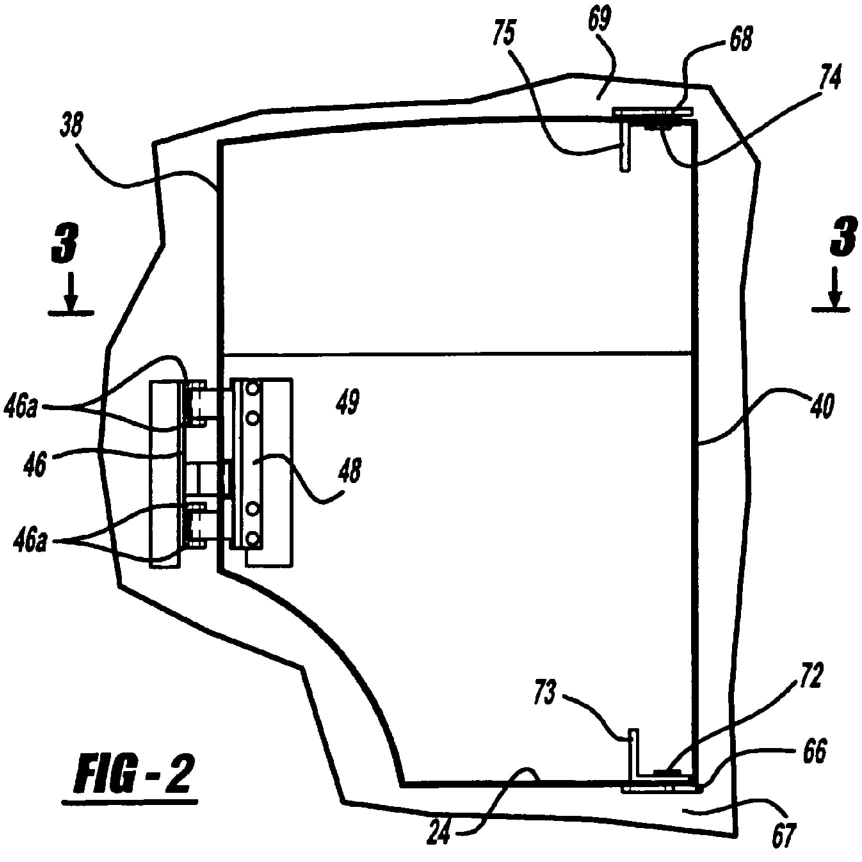
FIG. 2 is an enlarged elevational view of the dual-axis door hinge assembly of FIG. 1.
Figure 3:
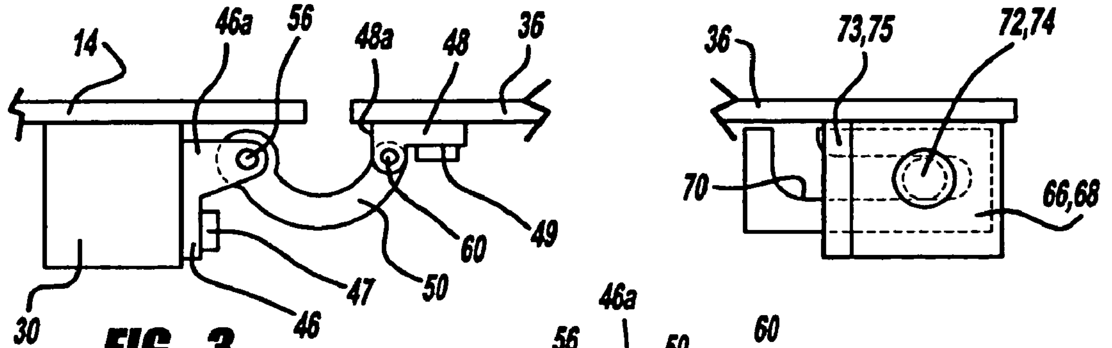
FIG. 3 is a sectional view taken along line 3—3 of FIG. 2.
Figure 4:
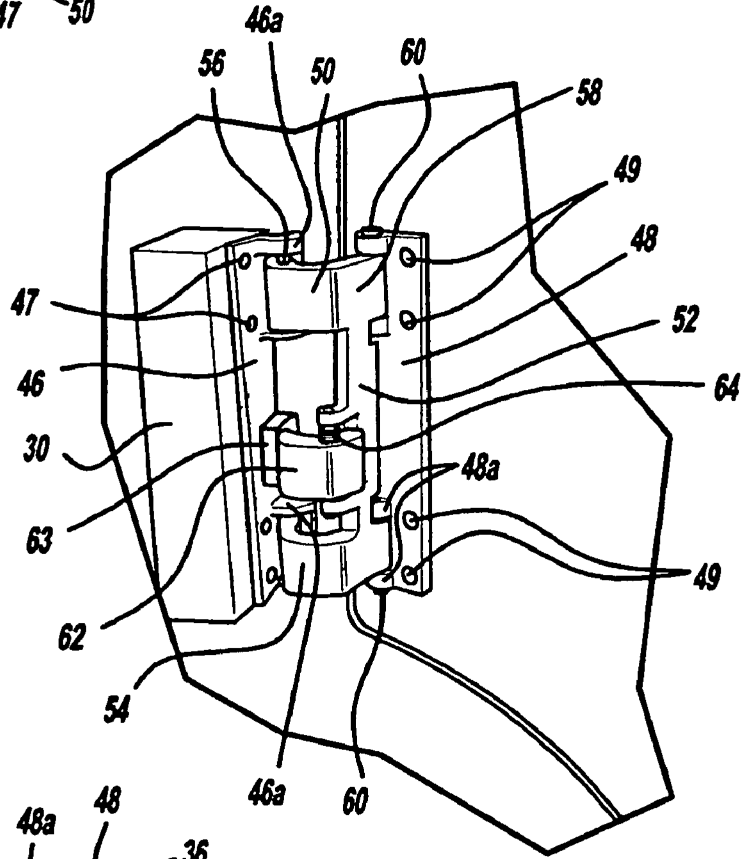
FIG. 4 is a perspective view of the dual-axis hinge assembly of FIG. 1.

Referring to the drawings and in particular FIGS. 1 through 3, one embodiment of a door assembly 10, according to the present invention, is shown for a vehicle, such as a motor vehicle, generally indicated at 12. The vehicle 12 includes a vehicle body 14 having a forward end 16, a rear end 18, and a pair of sides 20 (only one shown) spaced laterally and extending longitudinally between the forward end 16 and the rear end 18. The vehicle body 14 also includes a roof 22 and a floor 24 attached to the sides 20 to form an occupant compartment 26 therein.

The vehicle body 14 also includes at least one side 20 having a forward or "A" pillar 28 and a rear or "C" pillar 30 spaced longitudinally and extending generally vertically between the roof 22 and the floor 24 of the vehicle body 14. The vehicle body 14 includes a continuous and pillarless side door opening 32 in the side 20 extending longitudinally between the pillars 28 and 30 and vertically between the roof 22 and the floor 24. The vehicle 12 also includes a front side door 34 disposed in and closing a front or first portion of the door opening 32. The front side door 34 faces rearward or toward the rear end 18 of the vehicle body 14 and is attached at its forward end to the front pillar 28 by suitable means such as upper and lower hinges (not shown). The upper and lower hinges are conventional two-link hinges that have a single hinge axis. It should be appreciated that the front side door 34 is conventional and known in the art.

The door assembly 10 further includes a second or forward facing rear access or side door 36 disposed in and closing a rear or second portion of the door opening 32. The rear side door 36 faces forward or toward the front end 16 of the vehicle body 14. The rear side door 36 has a rear end 38 adjacent the rear pillar 30 and a forward end 40 adjacent a rear end of the front side door 34. The rear end 38 of the rear side door 36 is attached to the rear pillar 30 by a dual axis door hinge assembly, according to the present invention and generally indicated at 42, to be described. The door assembly 10 further includes a striker or latch member (not shown) attached to the forward end 40 of the rear side door 36 for engagement and disengagement with a latch (not shown) on a rear end 44 of the front side door 34. It should be appreciated that the latch member and latch are conventional and known in the art. It should also be appreciated that the front side door 34 and rear side door 36 are joined together in a pillarless manner.

Referring to FIGS. 1 through 4, the door assembly 10 includes at least one dual-axis door hinge assembly, according to the present invention and generally indicated at 42, for attaching the rear side door 36 to the vehicle body 14. The dual-axis door hinge assembly 42 enables the opening and closing of the rear side door 36 independently of the front side door 34. The dual-axis door hinge assembly 42 includes a body side strap 46 connected to the rear pillar 30 by suitable means such as fasteners 47. The body side strap 46 extends vertically and is generally rectangular in shape. The body side strap 46 is made of a metal material such as steel. The body side strap 46 has at least one, preferably a pair of flanges 46*a* extending outwardly and spaced vertically for a function to be described. The body side strap 46 is a monolithic structure being integral, unitary, and one-piece.

The dual-axis door hinge assembly 42 also includes a door side strap 48 connected to the rear end 38 of the rear side door 36 by suitable means such as fasteners 49. The door side strap 48 extends vertically and is generally rectangular in shape. The door side strap 48 has at least one, preferably a pair of flanges 48*a* extending outwardly and spaced vertically for a function to be described. The door side strap 48 is made of a metal material such as steel. The door side strap 48 is a monolithic structure being integral, unitary, and one-piece.

The dual-axis door hinge assembly 42 includes an intermediate link 50 operatively interconnecting the body side strap 44 and the door side strap 48. The intermediate link 50 is generally arcurate in shape and extends vertically. The intermediate link 50 has a base portion 52 extending vertically and a body portion 54 extending laterally from a top and bottom of the base portion 52 and pivotally connected to the body side strap 46 by suitable means such as a pivot pin 56 extending through each pair of the flanges 46*a* to form a first or inboard hinge axis. The intermediate link 50 also has a door portion 58 extending laterally from a top and bottom of the base portion 52 and pivotally connected to the door side strap 48 by suitable means such as a pivot pin 60 extending through each pair of the flanges 48*a* to form a second or outboard hinge axis. The intermediate link 50 has an intermediate portion 62 pivotally connected by suitable means such as a pin to the base portion 52. The intermediate portion 62 cooperates with a catch 63 connected to the body side strap 46. A torsional spring 64 cooperates with the intermediate portion 62 to urge the intermediate portion 62 into contact with the catch 63. The intermediate link 50 is made of a metal material such as steel. It should be appreciated that the pivot pins 56 and 60 are securely held in place by suitable means such as fasteners (not shown) and allow rotation of the intermediate link 50 relative to the body side strap 46 and door side strap 48.

The door assembly 10 also includes a lower track 66 connected to a rocker sill 67 of the vehicle body 14 and an upper track 68 connected to a header 69 of the vehicle body 14. The lower track 66 and upper track 68 each include a track slot 70 having a generally "L" shape extending therethrough. The door assembly 10 further includes a lower pin 72 connected by suitable means such as a bracket 73 to the forward end 40 of the rear side door 36 and an upper pin 74 connected by suitable means such as a bracket 75 to the forward end 40 of the rear side door 36. The lower pin 72 and upper pin 74 extend into the track slot 70 in the lower track 66 and upper track 68, respectively, for a function to be described.

In operation, to open the front side door 34, a handle 76 upon the front side door 34 is actuated to release the latch from the latch member and the front side door 34 is pivoted outwardly and forwardly. The rear side door 36 is in a closed position as illustrated in FIG. 1. When the rear side door 36 is in the closed position, the dual-axis door hinge assembly 42 is in a closed position as illustrated in FIGS. 1 through 3. In the closed position, the lower pin 72 and upper pin 74 extend into the track slot 70 in the lower track 66 and upper track 68, respectively, to guide the rear side door 36 during a first stage of movement. It should be appreciated that, in the closed position, the rear end 44 of the front side door 34 overlaps the forward end 40 of the rear side door 36 for structure and sealing purposes.

Figure 5:
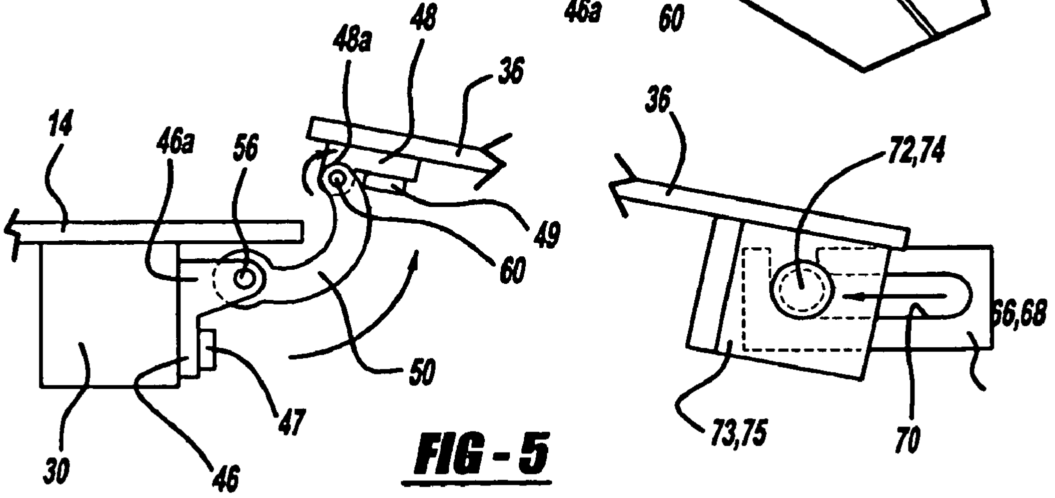
FIG. 5 is a partial plan view of the dual-axis door hinge assembly of FIG. 1 illustrated in a first operational position.

To open the rear side door 36, an operator (not shown) pushes on the rear side door 36 for a first stage of movement. The first stage of this movement consists of the forward end 40 of the rear side door 36 sliding rearward due to the lower pin 72 sliding in the track slot 70 of the lower track 66 and the upper pin 74 sliding in the track slot 70 of the upper track 68 while the rear end 38 of the rear side door 36 pivots outward as illustrated in FIG. 5. It should be appreciated that this movement eliminates the overlap between the rear side door 36 and the front side door 34. It should also be appreciated that the motion of the rear side door 36, while the pins 72,74 are engaged in the tracks 66,68, could be assisted using a mechanism (not shown) similar for a power sliding door or a power-closing trunk latch (not shown).

After the first stage of motion is complete, the rear side door 36 swings open in a rotation about the outboard hinge axis as illustrated in FIG. 6. As the rear side door 36 leaves the tracks 66,68 in the rocker sill 67 and header 69, the intermediate portion 62 is actuated by contact with the door side strap 48 and the intermediate portion 62, urged by the torsional spring 64, contacts the catch 63 to lock the inboard hinge axis. The motion of the rear side door 36 is thus constrained to a single degree of freedom, and the rear side door 36 cannot "flop around" due to movement of the intermediate link 50 while opened. The rear side door 36 may be rotated to be fully opened to approximately ninety degrees (90°) as illustrated in FIG. 7. It should be appreciated that the intermediate portion 62 engages the catch 63 as the pins 72,74 leave the tracks 66,68. It should also be appreciated that the dual-axis door hinge assembly 42 allows only one active hinge axis at a time.

The operation is reversed for closing the rear side door 36. As the pins 72,74 on the rear side door 36 enter the tracks 66,68, the intermediate portion 62 is disengaged from the catch 63 by the door side strap 48 pressing against it and causing it to pivot. With the intermediate portion 62 disengaged from the catch 63 and the pins 72,74 having entered the tracks 66,68, the forward end 40 of the rear side door 36 slides forward while the rear end 38 of the rear side door 36 pivots inward, and the rear side door 36 is closed. It should be appreciated that the torsional spring 64 performs the closing motion of the intermediate portion 62 to contact the catch 63 while contact between the door side strap 48 and the intermediate portion 62 performs the release of the intermediate portion 62 from the catch 63. It should be appreciated that over-travel stops are integral in the dual-axis door hinge assembly 42. It should further be appreciated that the dual-axis door hinge assembly 42 is illustrated as a single unit, but could be broken down into upper and lower components for mass savings.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A door assembly for a vehicle comprising:

a front side door having a rear end and a forward end for pivotal connection to a front pillar of a vehicle body to open and close a front portion of a door opening;

a rear side door having a forward end and a rear end;

at least one dual-axis door hinge connected to said rear end of said rear side door and for connection to a rear pillar of the vehicle body and having a dual pivot to allow said rear side door to pivot independently of said front side door between an open position and a closed position relative to a rear portion of the door opening; and wherein said at least one dual-axis door hinge comprises a door side strap mounted to said rear side door, a body side strap mounted to the rear pillar, and an intermediate link pivotally connected to said body side strap to form a first pivot axis and pivotally connected to said door side strap to form a second pivot axis, said intermediate link includes a base portion and an intermediate portion pivotally connected to said base portion;

a catch connected to said body side strap and cooperating with said intermediate portion to lock and unlock said first pivot axis.

2. A door assembly as set forth in claim 1 including a spring cooperating with said intermediate portion to urge said intermediate portion into contact with said catch.

3. A door assembly as set forth in claim 1 including a lower track for connection to the vehicle body.

4. A door assembly as set forth in claim 3 including a lower pin connected to a forward end of said rear side door and cooperating with said lower track.

5. A door assembly for a vehicle comprising:

a front side door having a rear end and a forward end for pivotal connection to a front pillar of a vehicle body to open and close a front portion of a door opening;

a rear side door having a forward end and a rear end;

at least one dual-axis door hinge assembly connected to said rear end of said rear side door and for connection to a rear pillar of the vehicle body and having a dual pivot to allow said rear side door to pivot independently of said front side door between an open position and a closed position relative to a rear portion of said door opening; and an upper track for connection to the vehicle body.

6. A door assembly as set forth in claim 5 including an upper pin connected to a forward end of said rear side door and cooperating with said upper track.

7. A vehicle comprising:

a vehicle body having a front end, a rear end, opposed sides, and a continuous door opening in at least one of said sides;

a front side door having a rear end and a forward end pivotally connected to said vehicle body at a front end of said door opening to open and close a front portion of said door opening;

a rear side door having a forward end and a rear end;

a dual-axis door hinge assembly connected to said rear end of said rear side door and connected to said vehicle body at a rear end of said door opening and having a dual pivot to allow said rear side door to pivot independently of said front side door between an open position and a closed position relative to a rear portion of said door opening; and wherein said dual-axis door hinge assembly comprises a door side strap mounted to said rear side door, a body side strap mounted to said vehicle body, and an intermediate link pivotally connected to said body side strap to form a first pivot axis and pivotally connected to said door side strap to form a second pivot axis, said intermediate link includes a base portion and an intermediate portion pivotally connected to said base portion; and a catch connected to said body side strap and cooperating with said intermediate portion to lock and unlock said first pivot axis.

8. A vehicle as set forth in claim 7 including a spring cooperating with said intermediate portion to urge said intermediate portion into contact with said catch.

9. A vehicle as set forth in claim 7 including a lower track connected to said vehicle body.

10. A vehicle as set forth in claim 9 including a lower pin connected to a forward end of said rear side door and cooperating with said lower track.

11. A vehicle comprising:

a vehicle body having a front end, a rear end, opposed sides, and a continuous door opening in at least one of said sides;

a front side door having a rear end and a forward end pivotally connected to said vehicle body at a front end of said door opening to open and close a front portion of said door opening;

a rear side door having a forward end and a rear end;

a dual-axis door hinge assembly connected to said rear end of said rear side door and connected to said vehicle body at a rear end of said door opening and having a dual pivot to allow said rear side door to pivot independently of said front side door between an open position and a closed position relative to a rear portion of said door opening; and an upper track connected to said vehicle body.

12. A vehicle as set forth in claim 11 including an upper pin connected to a forward end of said rear side door and cooperating with said upper track.

* * * * *